US009258371B1

(12) United States Patent
Lai et al.

(10) Patent No.: US 9,258,371 B1
(45) Date of Patent: Feb. 9, 2016

(54) MANAGING INTERACTION WITH HOSTED SERVICES

(75) Inventors: Hsuan-Cheng Lai, Seattle, WA (US); Danny Ryan Stephens, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 654 days.

(21) Appl. No.: 13/429,225

(22) Filed: Mar. 23, 2012

(51) Int. Cl.
*G06F 15/16* (2006.01)
*H04L 29/08* (2006.01)

(52) U.S. Cl.
CPC ..................................... *H04L 67/16* (2013.01)

(58) Field of Classification Search
CPC ..... H04L 67/02; H04L 41/0896; H04L 67/16; H04L 67/28; G06Q 30/0601
USPC .................................................. 709/217, 218
See application file for complete search history.

(56) References Cited

U.S. PATENT DOCUMENTS

| | | | |
|---|---|---|---|
| 5,757,908 A | 5/1998 | Cooper et al. | |
| 5,870,717 A | 2/1999 | Wiecha | |
| 6,664,981 B2 | 12/2003 | Ashe et al. | |
| 6,735,768 B1 | 5/2004 | Tanaka | |
| 7,165,041 B1 | 1/2007 | Guheen et al. | |
| 7,315,830 B1 | 1/2008 | Wirtz et al. | |
| 7,324,969 B2 | 1/2008 | Pallister et al. | |
| 7,433,835 B2 | 10/2008 | Frederick et al. | |
| 7,466,835 B2 | 12/2008 | Stenberg et al. | |
| 7,467,206 B2 | 12/2008 | Moore et al. | |
| 7,729,954 B2 | 6/2010 | Frederick et al. | |
| 7,729,955 B2 | 6/2010 | Frederick et al. | |
| 7,734,515 B1 * | 6/2010 | Frederick et al. | ............ 705/26.1 |
| 7,778,874 B1 | 8/2010 | Saunders | |
| 7,797,198 B1 | 9/2010 | Frederick et al. | |
| 7,801,771 B1 | 9/2010 | Sirota et al. | |

(Continued)

FOREIGN PATENT DOCUMENTS

| | | |
|---|---|---|
| CA | 2554462 | 8/2005 |
| CN | 103959317 A | 7/2014 |

(Continued)

OTHER PUBLICATIONS

Ebay, Inc.; Ebay Advertising Targeting homepage. 2012. Accessed Feb. 17, 2012. http://www.ebayadvertising.com/en/display-ads-targeting. 1 pg.

(Continued)

*Primary Examiner* — Brian J Gillis
*Assistant Examiner* — Shean Tokuta
(74) *Attorney, Agent, or Firm* — Knobbe, Martens, Olson & Bear, LLC

(57) ABSTRACT

Systems and methods are disclosed which facilitate managing interaction with instances corresponding to hosted services. Customers may implement services on a hosted computing environment. Further, the customer may allow limited interaction with the hosted service to a third party (e.g., in connection with a secondary service). For example, the third party may interact with a temporary copy of the hosted service. Thereafter, the customer may, given the consent of the third party, view details of the third party's interaction with the copy, and may be enabled to merge any alterations with the initial hosted service. In addition, a customer may monitor their own interactions with a hosted service or copies of a hosted service, and view details of the differences between multiple versions of the hosted service.

21 Claims, 7 Drawing Sheets

(56) References Cited

U.S. PATENT DOCUMENTS

| | | |
|---|---|---|
| 7,908,358 B1 | 3/2011 | Prasad et al. |
| 7,953,642 B2 | 5/2011 | Dierks |
| 7,958,529 B2 | 6/2011 | Green et al. |
| 8,005,723 B1 | 8/2011 | Sirota et al. |
| 8,019,652 B1 | 9/2011 | Frederick et al. |
| 8,019,653 B1 | 9/2011 | Frederick et al. |
| 8,019,660 B2 | 9/2011 | Westphal |
| 8,024,225 B1 | 9/2011 | Sirota et al. |
| 2002/0120519 A1 | 8/2002 | Martin et al. |
| 2003/0078850 A1 | 4/2003 | Hartman et al. |
| 2003/0195813 A1 | 10/2003 | Pallister et al. |
| 2004/0122926 A1 | 6/2004 | Moore et al. |
| 2004/0128321 A1* | 7/2004 | Hamer ........................ 707/104.1 |
| 2004/0243583 A1 | 12/2004 | Olsen |
| 2005/0038771 A1* | 2/2005 | Sugihara et al. .................. 707/1 |
| 2005/0039034 A1 | 2/2005 | Doyle et al. |
| 2005/0165656 A1* | 7/2005 | Frederick et al. ............... 705/26 |
| 2005/0256882 A1 | 11/2005 | Able et al. |
| 2007/0022447 A1 | 1/2007 | Arseneau et al. |
| 2007/0067297 A1 | 3/2007 | Kublickis |
| 2007/0233540 A1 | 10/2007 | Sirota |
| 2007/0294399 A1 | 12/2007 | Grossner et al. |
| 2007/0300240 A1 | 12/2007 | Viegener et al. |
| 2008/0098462 A1 | 4/2008 | Carter |
| 2008/0103975 A1 | 5/2008 | Taratino et al. |
| 2009/0037337 A1 | 2/2009 | Baitalmal et al. |
| 2009/0037492 A1 | 2/2009 | Baitalmal et al. |
| 2009/0119158 A1* | 5/2009 | Chen et al. ....................... 705/10 |
| 2009/0119779 A1 | 5/2009 | Dean et al. |
| 2009/0138380 A1 | 5/2009 | Roseman et al. |
| 2009/0144172 A1* | 6/2009 | Frederick et al. ............... 705/26 |
| 2009/0241037 A1 | 9/2009 | Hyndman |
| 2009/0288082 A1 | 11/2009 | Nazeer et al. |
| 2010/0114739 A1 | 5/2010 | Johnston |
| 2010/0262508 A1 | 10/2010 | Volnak |
| 2011/0119191 A1 | 5/2011 | Stern et al. |
| 2011/0126110 A1 | 5/2011 | Vilke et al. |
| 2011/0296000 A1 | 12/2011 | Ferris et al. |
| 2012/0278229 A1 | 11/2012 | Vishwanathan et al. |
| 2012/0278439 A1 | 11/2012 | Ahiska et al. |
| 2013/0085892 A1 | 4/2013 | Golden et al. |
| 2013/0085899 A1 | 4/2013 | Tyra et al. |
| 2014/0109046 A1 | 4/2014 | Hirsch et al. |

FOREIGN PATENT DOCUMENTS

| | | |
|---|---|---|
| CN | 104115177 A | 10/2014 |
| GB | 2426362 | 11/2006 |
| JP | 2003-44602 | 2/2003 |
| JP | 2007-149096 A | 6/2007 |
| JP | 2010-277187 A | 12/2010 |
| JP | 4743726 B1 | 8/2011 |
| WO | WO 2005/072342 A2 | 8/2005 |
| WO | WO 2013/049393 | 4/2013 |
| WO | WO 2013/049395 | 4/2013 |

OTHER PUBLICATIONS

Ranganathan et al., Advertising in a Pervasive Computing Environment, University of Illinois, pp. 6, Urbana, IL.

International Search Report and Written Opinion in PCT/US2012/057626 mailed Dec. 24, 2012.

International Search Report and Written Opinion in PCT/US2012/057624 mailed Dec. 6, 2012.

Doumae, K. Cloud in Japan—II Probation into Ability of GIO, Chapter 1—Cloud in Japan and IIJ GIO, G-Cloud Magazine, Japan, K.K. Gijutsu Hyoronsha, Sep. 10, 2010, pp. 100-101.

Nakata, Atsushi, Close up, Nikkei computer, No. 789, Nikkei Business Publications, Inc., Aug. 18, 2011, pp. 68-75.Nakata, A., Close up, Nikkei computer, No. 789, Nikkei Business Publications, Inc., Aug. 18, 2011, pp. 68-75.

Shimizu, M., EC2/S3/EBS, Virtual Server Construction by Cloud Computing, 1st ed., Socym Co., Ltd., Shoichiro Takeda, Aug. 27, 2009, pp. 128-138.

Taniguchi, T., Cloud in Japan—II Probation into Ability of GIO, Chapter 2—Using IIJ Cloud: It's Simple! Establishing the Web Server by Using the GIO Hosting Package, G-Cloud Magazine, Japan, K.K. Gijutsu Hyoronsha, Sep. 10, 2010, pp. 102 109.

Taniguchi, T., Cloud in Japan—II Probation into Ability of GIO, Chapter 3—Full-Scale! Example of Structuring Using GIO Component Service—Encouraging Full-Scale Cloud Infrastructure with Parts Selected and Used, G-Cloud Magazine, Japan, K.K. Gijutsu Hyoronsha, Sep. 10, 2010, pp. 110-117.

International Preliminary Report on Patentability received in PCT/US2012/057624 dated Apr. 1, 2014.

Supplementary Search Report received in European Application No. 12834770.5 dated Apr. 10, 2015.

Office Action received in Japanese Application No. 2014-533330 dated Mar. 2, 2015.

Office Action received in Australian Application No. 2012315939 dated Mar. 10, 2015.

Office Action received in Singapore Application No. 2014012645 dated Mar. 27, 2015.

Office Action received in Canadian Application No. 2850008 dated May 19, 2015.

Office Action received in Australian Application No. 2012315941 dated Mar. 10, 2015.

Office Action received in Japanese Application No. 2014-533331 dated Feb. 23, 2015.

Supplementary Search Report in European Application No. 12835825.6 dated Jul. 14, 2015.

U.S. Appl. No. 13/249,143, filed Sep. 29, 2011, Enterprise Software Marketplace.

U.S. Appl. No. 13/249,054, filed Sep. 29, 2011, Customizable Uniform Control User Interface for Hosted Service Images.

U.S. Appl. No. 13/248,227, filed Sep. 29, 2011, Electronic Marketplace for Hosted Service Images.

U.S. Appl. No. 13/326,840, filed Dec. 15, 2011, Providing Trial Use of Hosted Service Images.

U.S. Appl. No. 13/326,854, filed Dec. 15, 2011, Providing Trial Use of Hosted Service Images.

U.S. Appl. No. 13/429,227, filed Mar. 23, 2012, Managing Interaction With Hosted Services.

* cited by examiner

MANAGING INTERACTION WITH HOSTED SERVICES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit, of the general public.

To facilitate increased utilization of data center resources, virtualization technologies allow a single physical computing device to host one or more instances of a virtual machine, which virtual machine instance appears to a user of a data center as an independent computing device. With virtualization, the host computing device can create, maintain, delete, or otherwise manage virtual machines instances in a dynamic manner. In turn, users can request computing resources from the data center, including single computing devices or a configuration of networked computing devices, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently. One or more virtual machine instance configurations are often contained within a service image, which a host computing device may execute in order to implement the desired specific functionality of the virtual machine instance.

In one embodiment, the service image, when executed by virtual machine instance, provides a network accessible service (a.k.a. Web service) corresponding to the software applications/configurations included in the service image. A network accessible service provides specific functionality to other applications and computing resources via a network through application programming interfaces (APIs), which APIs can also be considered a network accessible service or Web service. For example, a service image, when executed, may provide a network accessible database or mass storage service. Once a service image is created, it can be provided to users interested in utilizing the applications and computing resources available from a data center for specific purposes. Interaction with a Web service may result in accessing, creating, modifying, or deleting information maintained by the Web service.

In some instances, additional services may be available which act to access or modify a Web service. For instance, technical support services may be available to diagnose and repair Web services. Such technical support services may, in some instance, be provided by a third party that is otherwise unaffiliated with an operator of the web service. Additional services performed by such a third party may execute a number of operations on the Web service, and may read, create, modify, or delete information from the Web service.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
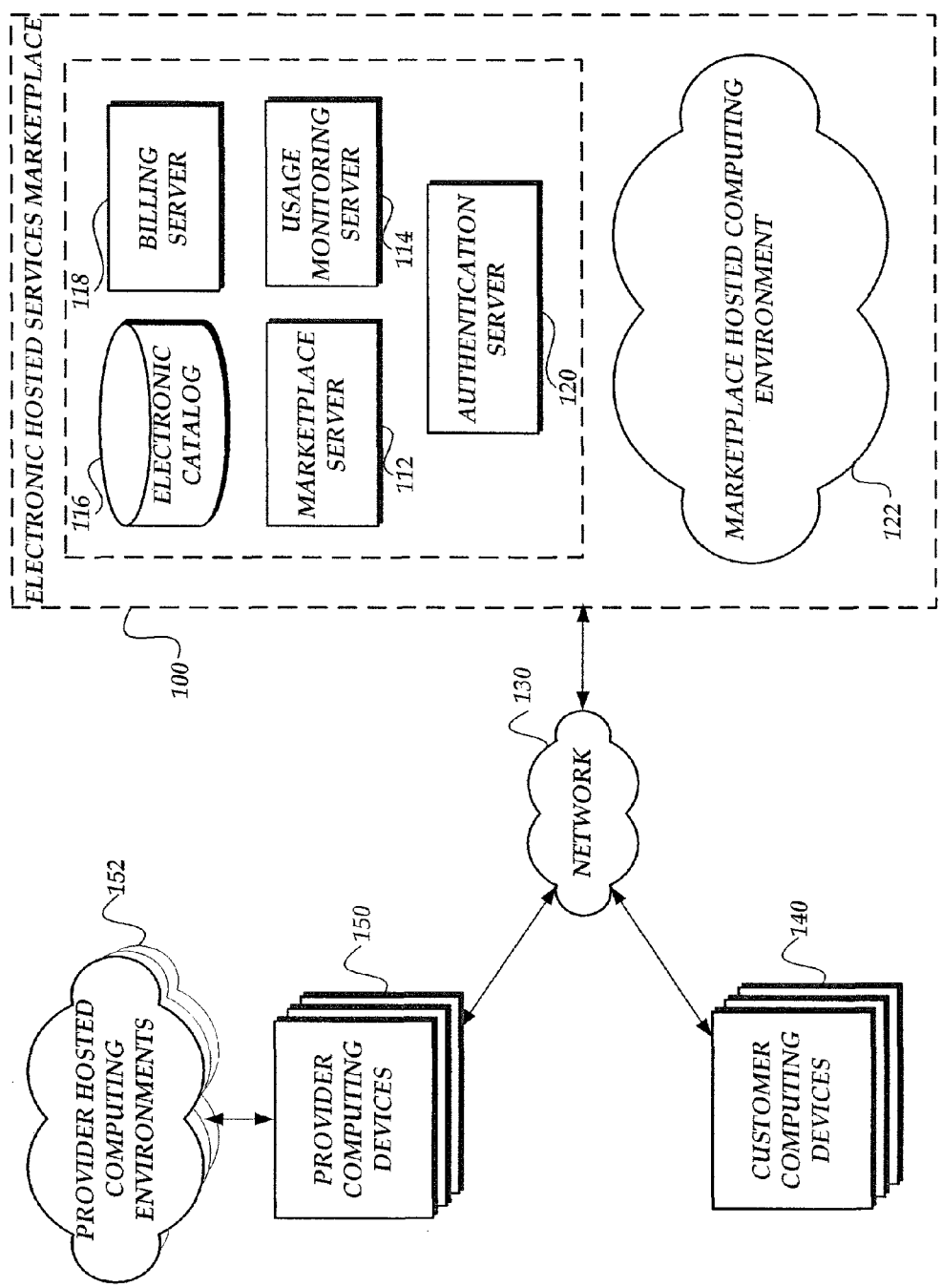
FIG. 1 is a schematic block diagram depicting an illustrative operating environment in which an electronic hosted services marketplace enables customers to browse descriptions of services and acquire services made available in the marketplace.

Generally described, aspects of the present disclosure relate to managing interaction with services available from an electronic hosted services marketplace. More specifically, an electronic hosted services marketplace is provided that permits users to browse descriptions of services, such as service images implementing desired functionalities or services. The service images may be submitted to, and made available from, the electronic hosted services marketplace, by third party providers or may be submitted to the marketplace by the operator of the marketplace itself. In addition, complimentary services may be offered by the electronic hosted services marketplace that are implemented on or require interaction with other services or service images. For example, a technical support service may be offered which interacts with a previously acquired service or service image. As a further example, design consultants may modify a customer's previously acquired services in accordance with the customer's wishes. The electronic hosted services marketplace may further enable a customer to manage interactions with the customer's services either by the customer or by a third party. For example, the customer may monitor their interactions with or utilizations of a service in order to review a history of those interactions for recording purposes. As a further example, the customer may monitor utilization of a service in order to maintain various versions of a service. Illustratively, a customer may wish to test a modification to a service while maintaining the ability to remove or reject the modification in the future. Still further, the electronic hosted services marketplace may enable a customer, with the consent of an interacting third party, to monitor interactions with the customer's instance. As such, the customer may allow interaction with an instance while maintaining the ability to review, accept, or reject those interactions. Though monitoring of interactions with a service is discussed herein, the present disclosure is not intended to indicate that monitoring would be performed without the consent of any monitored party, or to imply that monitored information would be used by an electronic hosted services marketplace or another party without the express consent of a customer or an interacting party.

Accordingly, a customer may purchase a service from the electronic hosted services marketplace, and the service may thereafter be implemented on a hosted computing environment. In some embodiments, the hosted computing environment may be maintained by the third party provider of a service. In other embodiments, the hosted computing environment may be maintained or associated with the electronic hosted services marketplace. As discussed in greater detail below, embodiments of the electronic hosted services marketplace may enable customers to monitor interaction with hosted services. In some embodiments, interaction of the customer may be monitored, such that the customer may review their previous interaction with a service. In other embodiments, interaction by third parties (such as those associated with another service) may be monitored, such that the customer can review the third parties actions. In still more embodiments, a customer may be enabled to accept or deny any monitored interactions, or to maintain separate instances of a hosted service, such that interactions which have not been accepted do not effect the customer's executing hosted service. As will be discussed below, monitoring of interaction may be facilitated by reviewing the actions taken by a party when interacting with a hosted service image. Monitoring of interactions may further be facilitated by viewing the differences in data associated with multiple instances of a hosted service. For example, in some embodiments, a party may interact with a copy of a hosted service instance (rather than the original hosted service instance). Thereafter, the customer may review the differences between data associated with the original hosted service instance and the copy of the hosted service instance. The customer may further be enabled to accept or deny the differences in data. For example, acceptance of the differences in data may replace the original hosted service instance with the modified copy of the hosted service image. Rejection of the differences in data may delete the copy of the hosted service image.

Though generally referred to herein with respect to service images, services available via the electronic hosted services marketplace may, in some embodiments, be implemented without use of a service image. For example, the electronic hosted services marketplace may include services providing access to applications or data sets, either of which may or may not be associated with a service image. In addition, the electronic hosted services marketplace may provide access to either partially or wholly human-provided services. Illustratively, such human-provided services may correspond to customer services or to technical support services. As such, though reference to service images may be made below, the current disclosure should not be limited to facilitating transfer of licenses related to service images, but may encompass facilitating transfer of licenses related to any service available from and provided by an electronic hosted services marketplace.

Embodiments discussed below may refer to the users of an electronic hosted services marketplace for service images as customers. However, it may be understood that users are not limited to customers but may include owners, administrators, end users, and providers of service images purchased from the electronic hosted services marketplace.

Embodiments of an electronic hosted services marketplace which may offer service images for acquisition may be found in U.S. patent application Ser. No. 13/248,227, filed on Sep. 29, 2011, and entitled, "ELECTRONIC HOSTED SERVICES MARKETPLACE FOR HOSTED SERVICE IMAGES," the entirety of which is hereby incorporated by reference (the "'227 Application"). In brief, the electronic hosted services marketplace may provide an environment with which both providers and customers of service images can interact via a network. In one embodiment, a provider may submit a service image to the electronic hosted services marketplace for inclusion in an electronic catalog. The provider may submit additional information corresponding to the service image that would be useful to a customer, such as pricing information, usage conditions, a location of a provider hosted computing environment on which the service image can be hosted, or other information.

Customers may employ a user computing device to browse the electronic catalog by interaction with various user interfaces generated by the electronic hosted services marketplace, described in greater detail below. On identifying a service image of interest, the customer may view details of each service image in the electronic catalog, such as the information submitted by the provider of the service image. In some embodiments, a customer may view further information associated with a service image, such as usage statistics by other marketplace customers of the service image, reviews by other customers, or recommendations for similar or complementary service images. Accordingly, service images may be surfaced to customers in a variety of ways by the services marketplace, such as by navigation through a browse tree of services organized by function, type, size, etc. or through recommendations, reviews, etc.

Once a customer selects a service image, the customer may purchase or otherwise acquire the service image from the services marketplace. In some embodiments, the customer may be required to submit payment information for the service image prior to launch of the service image. After acquisition of the service image by the customer, the service image may be launched and executed by one or more hosted computing environments. The hosted computing environment may be provided by an operator of the services marketplace or may be otherwise associated with the services marketplace. In some embodiments, the third party provider of the acquired service image may provide a hosted computing environment for the service image acquired by the customer via the services marketplace.

Once a service image is launched and running on a hosted computing environment, the services marketplace can monitor the usage of functionality or services provided by service image and bill the customer/pay the provider accordingly. Moreover, the services marketplace may provide the customer with tools to manage, monitor, modify, etc. the service image.

In according with embodiments of the present disclosure, customers of the electronic hosted services marketplace may, given the consent of a customer or other affected party, enable the customer to monitor utilization of services or service images hosted on a hosted computing environment. Such monitoring may be desired, for instance, where interaction with a hosted service is not limited solely to the acquiring customer. For example, as will be described in more detail below, services made available by the electronic hosted services marketplace may include to partially or wholly human-provided services in addition to other services. In some instances, these human-provided services may be complimentary to other provided services. For example, complimentary services may operate to alter or interact with other hosted services. Illustratively, the electronic hosted services marketplace may offer service images including software applications, and may also offer technical support services for those software applications. As such, if a customer purchases such technical support services, the customer may desire to monitor how a technical support worker interacts with or utilizes the software application. Further, a customer may wish to verify such interactions prior to implementing the interactions on the hosted service. In some instances, a customer may wish to reject such interactions and thereby leave a software application unaltered by a technical support worker. Though discussed above with respect to human-provided services available from the electronic hosted services marketplace, in some instances, customers may desire to monitor interaction with additional parties. For example, a customer may allow public or semi-public access to a hosted service subject to monitoring of interaction. In still more instances, a customer may desire to monitor their own interaction with a hosted service. For example, a customer may wish to review a history of previous utilizations for logging purposes. As a further example, customers may desire to test certain interactions without modifying a running service. As such, though generally described herein with reference to a human-provided service, any interaction with a hosted service may be monitored without departing from the scope of the present disclosure. Thus, in accordance with the present disclosure, any interaction with a customer's hosted service may, with the consent of an interacting party, be managed by the customer.

In some embodiments, in order to promote monitoring of hosted services, multiple instances of a service may be implemented within a hosted computing environment. Generally speaking, an instance of a service refers to a computing device which has executed, loaded, or launched a service. Multiple instances may facilitate monitoring of interaction, for example, by allowing interactions to occur on a copy of an executing service. For example, the electronic hosted services marketplace may implement an instance of a service on behalf of a customer. Thereafter, the customer may wish to allow a third party, such as a party associated with a complimentary service, to interact with the instance of the service. However, the customer may desire to maintain the ability to accept or reject any changes to the instance made by the third party. As such, the electronic hosted services marketplace may execute a second instance replicating the original instance. The third party may then interact with the second instance. Thereafter, the customer may review the interaction by the third party with the second instance. If the interaction is acceptable, the customer may elect to replace the original instance of the service with the modified second instance. In some embodiments, a customer may be enabled to maintain multiple replica instances of a service. Such multiple replicas may be desirable, for example, where a customer desires to test multiple interactions with a service prior to accepting those interactions. Illustratively, each replica may correspond to an experimental change to an executing instance.

In addition, in some embodiments, the electronic hosted services marketplace may be configured to track interaction with a single instance of a service, and to maintain state data of the instance at various periods. For example, in some embodiments, a customer may elect to mark a point at which data corresponding to the instance is recorded. As such, the customer may be enabled, at a future point in time, to return the service to the state corresponding to the recorded data. For example, a customer may elect to record data corresponding to an instance prior to allowing a third party to interact with the instance. Subsequent to such interaction, the customer may elect to return the instance to the state corresponding to the recorded data.

In some embodiments, customers may be enabled to monitor interaction with an instance of a hosted service by viewing a listing of actions taken on the hosted service over a specified time period. Illustratively, a customer may desire to review all interaction with an instance of a hosted service by a specified third party. In order to facilitate such review, the electronic hosted services marketplace may be configured to monitor the actions of the third party with respect to the instance. Monitored actions may include, for example, commands executed on a service or information retrieved from a service. In some embodiments, actions may by monitored based on textual input to a service, interaction with a service via a pointing device, or other input device. In still more embodiments, actions may be monitored based on output of the instance, such as display output. Thereafter, the customer may be enabled to review these interactions. For example, the customer may be enabled to view each command typed by a third party with respect to the service instance. As a further example, the customer may be enabled to review the files or data viewed by the third party while interacting with the instance. Such review may be beneficial, for example, in order to verify that the third party did not access private or confidential information of the customer. In some embodiments, such a review may be helpful to allow the customer to learn from the interactions by the third party. For example, where a third party is affiliated with a technical support service, the customer may review the actions of the technical support service in order to discover how corrections to a service instance were made.

In some instances, it may be unnecessary or undesirable for a customer to view, in detail, each interaction with an instance by a third party. For example, a customer may be overwhelmed with a history of every command typed, or every mouse path or click of a third party. As a further example, a third party may desire to abstract their utilizations somewhat. Illustratively, if the third party is associated with an optimization service, the interactions of the third party in order to optimize an instance may be protected or proprietary information. As such, in some embodiments, the electronic hosted services marketplace may be configured to abstract, obscure, or filter monitored interactions. For example, a customer may be enabled to select types of interaction to view, or to select types of interaction to exclude. Illustratively, the customer may desire to see a listing of all data read or modified, but may not desire to see a listing of all entered commands. In addition, in situations where the details of interaction should be obscured, the customer may be enabled to view which data has been read or modified, but may not be enabled to view the specific modifications to the data. Though examples of abstraction and filtering are given herein, the abstraction, obscuring, and filtering of information may include displaying various specificities of information according to the desires of the customer and of the third party.

As described above, in some embodiments, the use of multiple instances may further facilitate monitoring of interaction. For example, a third party may be enabled to interact with a replica of the customer's original instance. Thereafter, the customer may review the interactions by the third party with the replica instance. The customer may further be enabled to accept the interactions of the third party, and thereby integrate the interactions within the original instance. Similarly, the customer may be enabled to reject the interaction so the third party, and thereby delete the replica instance. As such, the customer may allow third parties to interact with an instance with minimized risk that the instance will be damaged.

In some embodiments, customers may be enabled to view changes in data associated with a hosted service that resulted from an interaction. For example, the electronic hosted services marketplace may determine a first set of data reflective of all or a portion of a hosted service instance prior to an interaction with the instance. Illustratively, a set of data may be reflective of a file system of a service, such as a service image. As a further example, a set of data may be reflective of the data contained within a database of information. Similarly, the electronic hosted services marketplace may determine a second set of data reflective of the same portion of the hosted service subsequent to interaction with the hosted service. Accordingly, the electronic hosted services marketplace may compare the first set of data with the second set of data to determine any changes which occurred based on the interaction. Illustratively, a customer may wish to allow an optimization service to interact with a database instance. In addition, the customer may elect to record the state of the database instance prior to allowing such interaction. Subsequent to interaction with the database by the optimization service, the customer may then wish to verify any modifications to the database by the optimization service. By comparing the data within the database both before and after the interaction, the customer may be enabled to view each item of data which was created, modified, or deleted by the optimization service. As described above, the customer may be enabled to accept or reject the changes made by an interaction. As will be discussed in more detail below, in some embodiments, the customer may be enabled to accept or reject changes made to individual items of data. For example, the customer may be enabled to allow deletion of a first item of data in a database, but to deny creation of a second item of data.

The simplified examples described above are intended to convey some, but not all, potential embodiments and applications of the present disclosure. Though described above with respect to third party interactions, in some embodiments, a customer may be enabled to monitor any interactions with an instance of a hosted service, including interactions by the customer. For example, a customer may be enabled to review their own interactions in order to maintain a log of interactions. As a further example, a customer may be enabled to maintain records of data associated with an instance at multiple points in time, such that previous versions of an instance may be recreated. As such, the present disclosure should not be limited to managing interactions with third parties, but may encompass management of any interactions with an instance of a hosted service.

With reference to FIG. 1, an illustrative operating environment is shown which includes an electronic hosted services marketplace 100 that enables customers to browse descriptions of services available from the electronic hosted services marketplace 100 and acquire such services. Acquired services may be implemented within a hosted computing environment, as discussed in greater detail below. In some embodiments, as will be discussed below, services may be offered on the electronic hosted services marketplace 100 that interact with other acquired services. For instance, technical support services may be offered which require interaction of a third party with a software service or with a service image. The electronic hosted services marketplace 100 may further enable customers to review interactions with hosted services acquired from the electronic hosted services marketplace 100, such as interactions by the customer or interactions by third parties.

As illustrated in FIG. 1, the operating environment includes one or more provider computing devices 150 and one or more customer computing devices 140 in communication with an electronic hosted services marketplace 100 via a network 130. A third party provider, using a provider computing device 150, may submit via the network 130 a service or service image implementing a service to the electronic hosted services marketplace 100. The electronic hosted services marketplace 100 may make the submitted service, as well as other services or service images implementing services, available to customers.

Accordingly, a customer, using his or her customer computing device 140, may communicate with the electronic hosted services marketplace 100 regarding services made available by the electronic hosted services marketplace 100. In one embodiment a customer may communicate with the electronic hosted services marketplace 100 in order to browse descriptions of services made available by the electronic hosted services marketplace 100, including the availability of licenses corresponding with the service and any terms of such licenses. In another embodiment, a customer may communicate with the electronic hosted services marketplace 100 in order to acquire a desired service. In a further embodiment, a customer may communicate with the electronic hosted services marketplace 100 in order to launch an acquired service. Launching of a service may occur within a marketplace hosted computing environment 122 operated, maintained, provided or otherwise associated with the operator of the electronic hosted services marketplace 100. In alternative embodiments, where an acquired service was submitted to the electronic hosted services marketplace 100 by a third party provider, the acquired service may be launched in a provider hosted computing environment 152 that is operated, maintained, provided or otherwise associated with the third party provider.

A hosted computing environment (e.g., marketplace hosted computing environment 122 or provider hosted computing environment 152) may include a collection of rapidly provisioned and released computing resources hosted in connection with the marketplace or a third party provider. Such computing resources may be referred to, individually, as host computing devices. The computing resources may further include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. One example of a hosted computing environment is given in U.S. Pat. No. 7,865,586 entitled "Configuring Communications Between Computing Nodes" and issued Jan. 4, 2011, which is hereby incorporated by reference in its entirety. A hosted computing environment may also be referred to as a cloud computing environment.

Though described herein with reference to hosted computing environments associated with a provider of a service and with the electronic hosted services marketplace 100, in some embodiments, additional hosted computing environments may be utilized. For example, a customer computing device 140 may provide a customer hosted computing environment (not shown), or a third party may provide a third party hosted computing environment (not shown). Any or all of these additional hosted computing environments may be accessible to the electronic hosted services marketplace 100, and may be utilized to host services available from the electronic hosted services marketplace 100. For purposes of brevity, such additional hosted computing environments may also be referred to herein as "provider hosted computing environments.

The provider computing devices 150 and the customer computing devices 140 may communicate with the electronic hosted services marketplace 100 via a network 130. The provider computing device 150 or customer computing device 140 may be any computing device, such as personal computer (PC), kiosk, thin client, home computer, and dedicated or embedded machine. Further examples may include a laptop or tablet computers, servers, personal digital assistant (PDA), hybrid PDA/mobile phones, mobile phones, electronic book readers, set-top boxes, cameras, digital media players, and the like.

Those skilled in the art will appreciate that the network 130 may be any wired network, wireless network or combination thereof. In addition, the network 130 may be a personal area network, local area network, wide area network, cable network, satellite network, cellular telephone network, or combination thereof. In the illustrated embodiment, the network 130 is the Internet. Protocols and components for communicating via the Internet or any of the other aforementioned types of communication networks are well known to those skilled in the art of computer communications and thus, need not be described in more detail herein.

The electronic hosted services marketplace 100 is illustrated in FIG. 1 as operating in a distributed computing environment comprising several computer systems that are interconnected using one or more networks. More specifically, the electronic hosted services marketplace 100 may include a marketplace server 112, a usage monitoring server 114, an electronic catalog 116, a billing server 118, and an authentication server 120 discussed in greater detail below. However, it may be appreciated by those skilled in the art that the electronic hosted services marketplace 100 may have fewer or greater components than are illustrated in FIG. 1. In addition, the electronic hosted services marketplace 100 could include various Web services and/or peer-to-peer network configurations. Thus, the depiction of the electronic hosted services marketplace 100 in FIG. 1 should be taken as illustrative and not limiting to the present disclosure.

Any one or more of the marketplace server 112, the usage monitoring server 114, the electronic catalog 116, the billing server 118, and the authentication server 120 may be embodied in a plurality of components, each executing an instance of the respective marketplace server 112, usage monitoring server 114, electronic catalog 116, billing server 118, and authentication server 120. A server or other computing component implementing any one of the marketplace server 112, the usage monitoring server 114, the electronic catalog 116, the billing server 118, and the authentication server 120 may include a network interface, memory, processing unit, and computer readable medium drive, all of which may communicate which each other may way of a communication bus. The network interface may provide connectivity over the network 130 and/or other networks or computer systems. The processing unit may communicate to and from memory containing program instructions that the processing unit executes in order to operate the respective marketplace server 112, usage monitoring server 114, electronic catalog 116, billing server 118, and authentication server 120. The memory may generally include RAM, ROM, other persistent and auxiliary memory, and/or any non-transitory computer-readable media.

With further reference to FIG. 1, illustrative components of the electronic hosted services marketplace 100 will now be discussed. The marketplace server 112 may facilitate network submission by third party providers, and browsing and acquisition by customers, of service images in the electronic hosted services marketplace 100. Accordingly, a provider, utilizing a provider computing device 150, may submit one or more services (e.g., in the form of a service image) to the electronic hosted services marketplace 100 via the marketplace server 112. The submitted services may then be included in an electronic catalog 116. The process by which a provider, utilizing a provider computing device 150, submits a service to the electronic hosted services marketplace 100 is described in greater detail in the '227 Application.

The electronic catalog 116 may include information on services available from a plurality of providers and on services made available by the operator of the electronic hosted services marketplace 100. Accordingly, the marketplace server 112 may obtain service information for services offered by a plurality of providers and the marketplace 100 and make information regarding the services available to a customer from a single network resource, such as a Web site. A customer may then acquire a service from the electronic hosted services marketplace 100 and launch the service on a hosted computing environment (e.g., the marketplace hosted computing environment 122 or the provider hosted computing environment 152) in a single interaction or order placed with the electronic hosted services marketplace 100. Beneficially, this eliminates the need for the customer to develop his or her own service; or research, search or otherwise investigate multiple different providers or other sources for the service.

Illustratively, marketplace server 112 may generate one or more user interfaces through which a customer, utilizing a customer computing device 140, may browse services made available by the electronic hosted services marketplace 100, submit queries for matching services, view information and details regarding specific services, acquire services, implement the services on a hosted computing environment, and review interactions with hosted services. An illustrative process by which a customer computing device 140 may query the electronic hosted services marketplace 100, and by which the marketplace server 112 generates a user interface, is described in more detail in the '227 Application incorporated by reference above.

After the customer selects a desired service from the electronic hosted services marketplace 100, the marketplace server 112 may facilitate the acquisition of the service, as well as configuration the service. The marketplace server 112 may further facilitate the launching of the service image on a hosted computing environment. In this regard, the marketplace server 112 may receive payment information from the customer computing device 140, as well as information specifying how the service should be implemented by a hosted computing environment. In some embodiments, the customer may select a specific hosted computing environment to host the selected service. The specific hosted computing environment may correspond, for example, to the marketplace hosted computing environment 122 associated with the electronic hosted services marketplace 100, or to a provider hosted computing environment 152 which is associated with the provider of the service.

Once the service is launched and running on a hosted computing environment, the electronic hosted services marketplace 100 may facilitate interaction with the service via the authentication server 120. Illustratively, the authentication server 120 may be configured to authenticate access to the hosted service. In some embodiments, all access to the service may be facilitated by the authentication server 120. In other embodiments, the authentication server 120 may facilitate access to the service by third parties, while the customer may be enabled to directly access the service. Further, each party accessing a service via the authentication server 120 may be enabled to utilize different authentication criteria, such as different passwords. As such, use of an authentication server 120 may enable a customer to allow access to a service to various parties without disclosing the customer's authentication information. Further, use of an authentication server 120 may enable a customer to allow access to a service under conditions specified by the customer. For example, a customer may enable a third party to access the hosted service only for a set duration of time. As such, the authentication server 120 may be configured to enable the third party to access the hosted service only for the specified duration. The authentication server 120 may be configured to restrict access to the hosted service according to a variety of conditions. Such conditions include, but are not limited to, timing of access, duration of access, and identity of the accessing party. One skilled in the art will appreciate that various additional conditions for access may be enforced by the authentication server 120.

In some embodiments, the authentication server 120 may act as a proxy for access to a hosted service. For example, the authentication server 120 may receive commands from an interacting computing device (e.g., a customer computing device 140), and forward those commands to the service executing on a hosted computing environment (e.g., the marketplace hosted computing environment 122). Further, the authentication server 120 may receive a response from the hosted service and forward the response to the interacting computing device. As such, all interactions with the hosted service may pass through the authentication server 120. Further, in some embodiments, the authentication server 120 may interact with the usage monitoring server 114 to monitor access to a hosted service. Accordingly, the marketplace hosted computing environment 122 may not be required to interact with the usage monitoring server 114 directly. In other embodiments, the authentication server 120 may act as an initial authentication with the hosted service, but may not require all interaction to pass through the authentication server 120. For example, an interacting computing device may be required to initially authenticate with the authentication server 120, and may thereafter directly interact with a hosted service.

In addition, the electronic hosted services marketplace 100 can monitor the usage of the service (or service image implementing a service) and bill the customer/pay the provider accordingly via the usage monitoring server 114 and the billing server 118, respectively. Moreover, the electronic hosted services marketplace 100 may provide the customer with tools to manage, monitor, modify, etc. the service or service image implementing the service. Specifically, in accordance with embodiments of the present disclosure, the electronic hosted services marketplace 100 may provide customers with tools to manage interactions with and utilization of instances of services or service images. As such, a customer may be enabled to review a history of interactions with a service by a third party or by the customer themselves. For example, the customer may be able to view specific commands or operations performed on an instance, or may be able to view the differences in data corresponding to two versions of a service (e.g., a first version prior to a monitored interaction and a second version after a monitored interaction). As will be described in more detail below, in some embodiments, multiple instances of a service may facilitate such interaction management. For example, a customer may allow a third party to interact with a service by enabling interaction with a replica of the customer's instance implementing the service. Such interaction may be facilitated, for example, by the authentication server 120, as described above. By use of such replicated instances, the customer's initial instance would be maintained. Thereafter, the customer may accept or reject reviewed interactions by the third party. For example, where the customer accepts the interactions by the third party, the customer's initial instance may be replaced with the replica instance (which the third party interacted with). If the customer rejects the third party's interactions, the replica instance may be deleted, maintaining the customer's initial instance. Moreover, the monitored interactions may be used for accurate billing of third party services. For example, where a third party service is billed according to the time spend interacting with an instance, or according to the specific interaction with an instance, the electronic hosted services marketplace 100 may facilitate that billing based on the monitored interaction, without requiring the third party service to provide such information. As a further illustrative example, electronic hosted services marketplace 100 may enable a customer to monitor their own interaction with a service or an instance of a service. As such, the customer may maintain multiple versions of a service and be enabled to accept or reject interactions with versions without modifying an initial instance, as will be described in more detail below.

The billing server 118 is provided to process payments from customers and, in some embodiments, provide payment to the providers of acquired services. The billing server 118 may receive and provide payment information via interaction with the marketplace server 112. In some embodiments, the billing server 118 may alternatively receive and provide payment information via other processes, such as via an additional server, via telephonic interaction, or other mechanisms.

As described above, in some embodiments, the electronic hosted services marketplace 100 may provide a variety of services, such as access to software applications, data sets, or either partially or wholly human-provided services. As will be appreciated by one skilled in the art, the illustrative components of FIG. 1 may enable the electronic service marketplace 100 to provide any one or more of these services.

Figure 2:
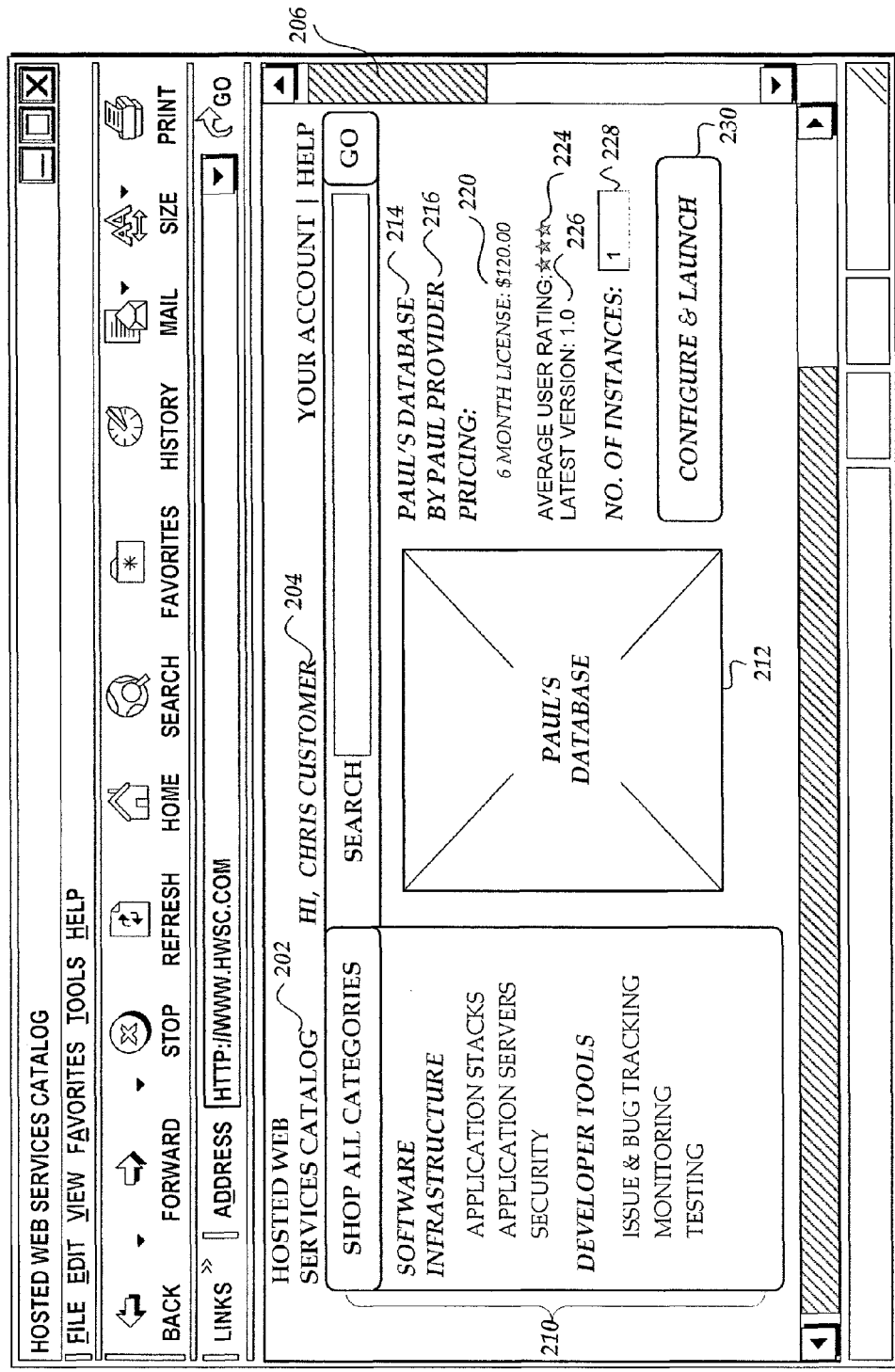
FIG. 2 depicts an illustrative user interface displayed on a customer computing device that presents information associated with a service image available via the electronic hosted services marketplace shown in FIG. 1.

FIG. 2 depicts an illustrative user interface 200 displayed on a customer computing device that presents information associated with a service available via the electronic hosted services marketplace 100. In one embodiment, user interface 200 is generated by marketplace server 112 as a result of navigation by the customer or as a result of selection of a search result returned by the marketplace server 112.

As shown in FIG. 2, the user interface 200 provides information retrieved from the electronic hosted services marketplace 100, i.e., a "Hosted Web Service Catalog" 202 to "Chris Customer" 204, an illustrative customer accessing the "Hosted Web Services Catalog." Because the customer is viewing details regarding a specific offered service, and may wish to browse to other services, navigation pane 210 is displayed. Navigation pane 210 contains links that enable a customer to browse and select other services available via the electronic hosted services marketplace 100. Currently, the user interface 200 depicts information for the service image "Paul's Database," which corresponds to a database service uploaded by a service provider. Additional information regarding uploading or providing services are described in more detail in the '227 Application.

Display features 212-230 display information corresponding to the service image. Display feature 212, for example, is a graphic associated with the service image. The graphic may correspond to a logo associated with the service image or with the service provider. Display features 214 and 216 depict the name of the service image and the provider of the service image, respectively. Display feature 220 depicts pricing information associated with the service image. Display feature 224 depicts reviews given to the service image by users of the "Hosted Web Services Catalog." As depicted, display feature 224 reflects that "Paul's Database" has been given, on average, a three star rating by users of the "Hosted Web Services Catalog." As will be appreciated by those skilled in the art, various other methods of displaying a rating of a service image may be employed. Display feature 226 depicts a version number of the service image; in the current example, version 1.0. In some embodiments, display feature 226 may be selectable to view alternative versions of the selected service image that are available. This may be desirable, for example, where previous versions have different desired characteristics, such as different pricings, features, compatibility, or ratings.

Input box 228 may be utilized by the customer to specify a number of instances of the selected service that the customer desires. As described above, an instance may generally refer to an execution, loading, or launching of the service image by a computing device (e.g., a virtual or physical computing device). A customer may wish to acquire multiple instances, for example, where the customer wishes to distribute processing or load access across multiple instances. In other examples, multiple instances may be functional to interact, or to provide different functionality via the same service. The number of instances specified by input box 228 may optionally be associated with a default value, such that the customer is not required to select a number of instances.

After inputting the desired number of instances (if necessary), the customer may activate input control 230 to further configure and launch the viewed service image. One example of a user interface used to further configure and launch a service image is discussed in detail in the '227 Application.

Though not displayed herein, the user interface 200 may display additional information regarding a service, such as similar services or configuration options of a service. Examples of additional information are described in more detail in the '227 Application.

Figure 3:
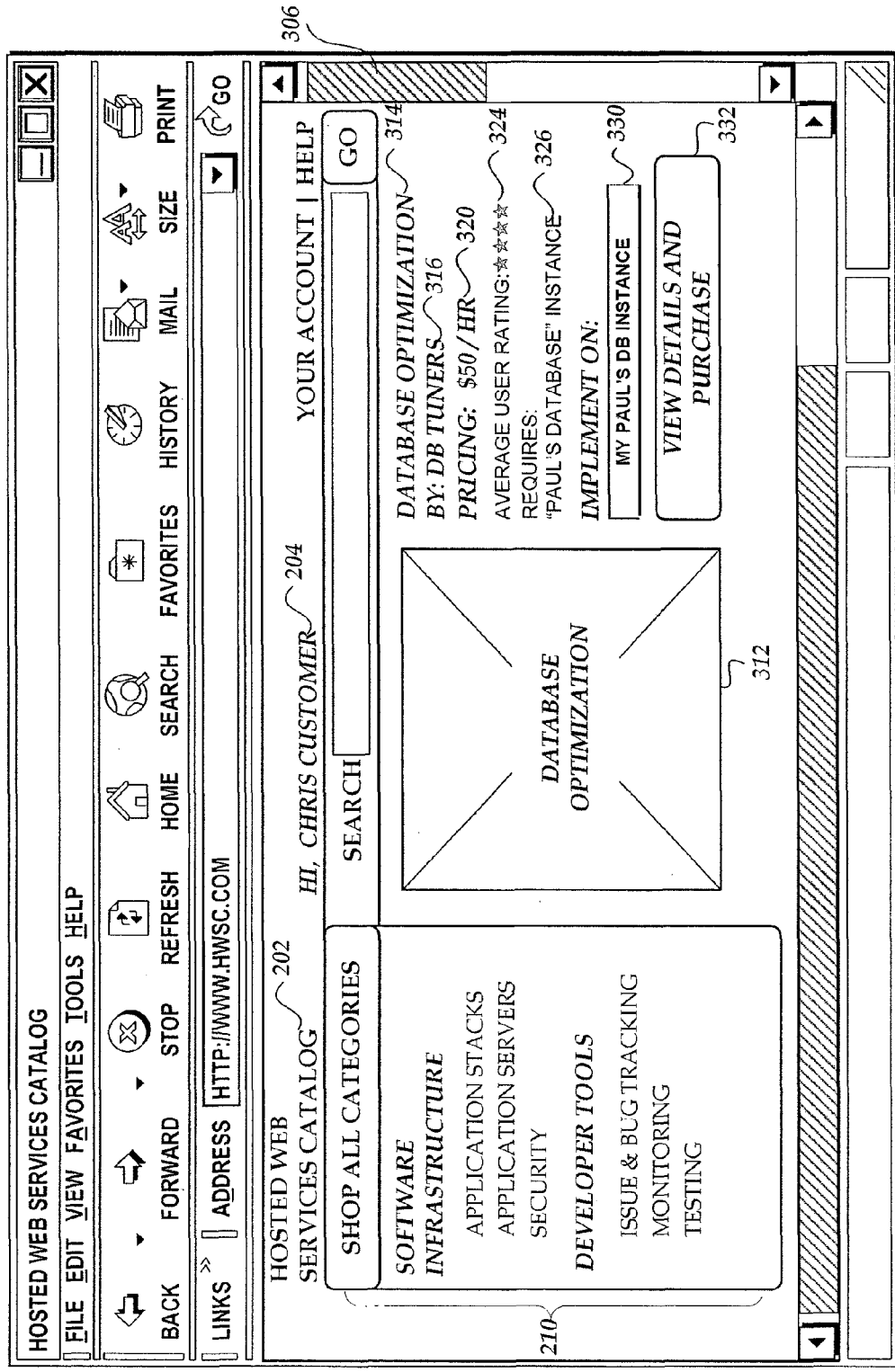
FIG. 3 depicts an illustrative user interface displayed on a customer computing device that presents information associated with a service available via the electronic hosted services marketplace shown in FIG. 1, wherein the service is implemented on a hosted service instance.

With reference to FIG. 3, an illustrative user interface 300 is displayed that presents information associated with an additional service available via the electronic hosted services marketplace 100. In one embodiment, user interface 300 is generated by marketplace server 112 as a result of navigation by the customer (e.g., by interaction with navigation panel 210 of FIG. 2) or as a result of selection of a search result returned by the marketplace server 112.

Similarly to as described above with reference to FIG. 2, the user interface 300 provides information retrieved from the electronic hosted services marketplace 100, i.e., a "Hosted Web Service Catalog" 202 to "Chris Customer" 204, an illustrative customer accessing the "Hosted Web Services Catalog." As depicted in FIG. 3, the user interface 300 depicts information for the service "Database Optimization," which corresponds to a service which may be acquired by customers in order to optimize an instance of the "Paul's Database" service image discussed in FIG. 2. As such, in this illustrative embodiment, acquisition of the "Database Optimization" service may require previous acquisition of the "Paul's Database" service. Further, acquisition of the "Database Optimization" service may enable third parties associated with the "Database Optimization" service to access a customer's instance of "Paul's Database" in order to perform optimizations. As such, the "Database Optimization" service may be seen as a complementary service to the "Paul's Database" service. One skilled in the art will appreciate that such an optimization service is only one example of complementary services which may be offered via an electronic hosted services marketplace.

Display features 312-332 display information corresponding to the "Database Optimization" service. Display feature 312, for example, is a graphic associated with the service, which may correspond to a logo associated with the service or with the service provider. Display features 314 and 316 depict the name of the service and the provider of the service, respectively. Display feature 320 depicts pricing information associated with the service. Though in this illustrative embodiment an hourly fee is displayed, one skilled in the art will appreciate that services may be associated with any number of various fee structures. For example, services may be associated with a single flat fee or associated with a fee based on the specific services provided. Where a complimentary service requires interaction with a customer's instance of another service or service image, monitoring of the complimentary services' interaction with the instance may facilitate more accurate billing of fees associated with the complimentary service. With continued reference to FIG. 3, display feature 324 depicts reviews given to the service image by users of the "Hosted Web Services Catalog." As depicted, display feature 324 reflects that "Database Optimization" has been given, on average, a four star rating by users of the "Hosted Web Services Catalog." Display feature 326 depicts a dependency of the "Database Optimization" service. Specifically, in this illustrative example, the "Database Optimization" service is a complementary service to the "Paul's Database" service of FIG. 2. As such, the "Database Optimization" service operates to modify or configure an instance of the "Paul's Database" service, and therefore requires an acquiring customer to have previously acquired (or concurrently acquire) the "Paul's Database" service.

Input box 330 may be utilized by the customer to specify an instance of a previously acquired service on which the "Database Optimization" service should be implemented. As displayed in FIG. 3, "Chris Customer" would like the "Database Optimization" service to be implemented on a previously acquired instance of "Paul's Database" entitled "My Paul's DB Instance." Accordingly, as will be discussed in more detail below with respect to FIG. 4, after acquisition of the "Database Optimization" service, a third party associated with the "Database Optimization" service may access the customer's instance (e.g., "My Paul's DB Instance") to carry out an optimization. As will also be discussed in more detail below, the customer may, in accordance with embodiments of the present disclosure, monitor the third party's interaction with the instance. Further, the customer may be enabled to accept or reject the third party's interaction, such that the customers instance (e.g., "My Paul's DB Instance") is not modified without the review and consent of the customer.

After specifying the instance on which a service should be implemented, the customer may activate input control 332 to further configure and launch the viewed service image. One example of a user interface used to further configure and launch a service image is discussed in detail in the '227 Application.

Though not displayed herein, the user interface 300 may display additional information regarding a service, such as similar services or configuration options of a service. Examples of additional information are described in more detail in the '227 Application.

Figure 4:
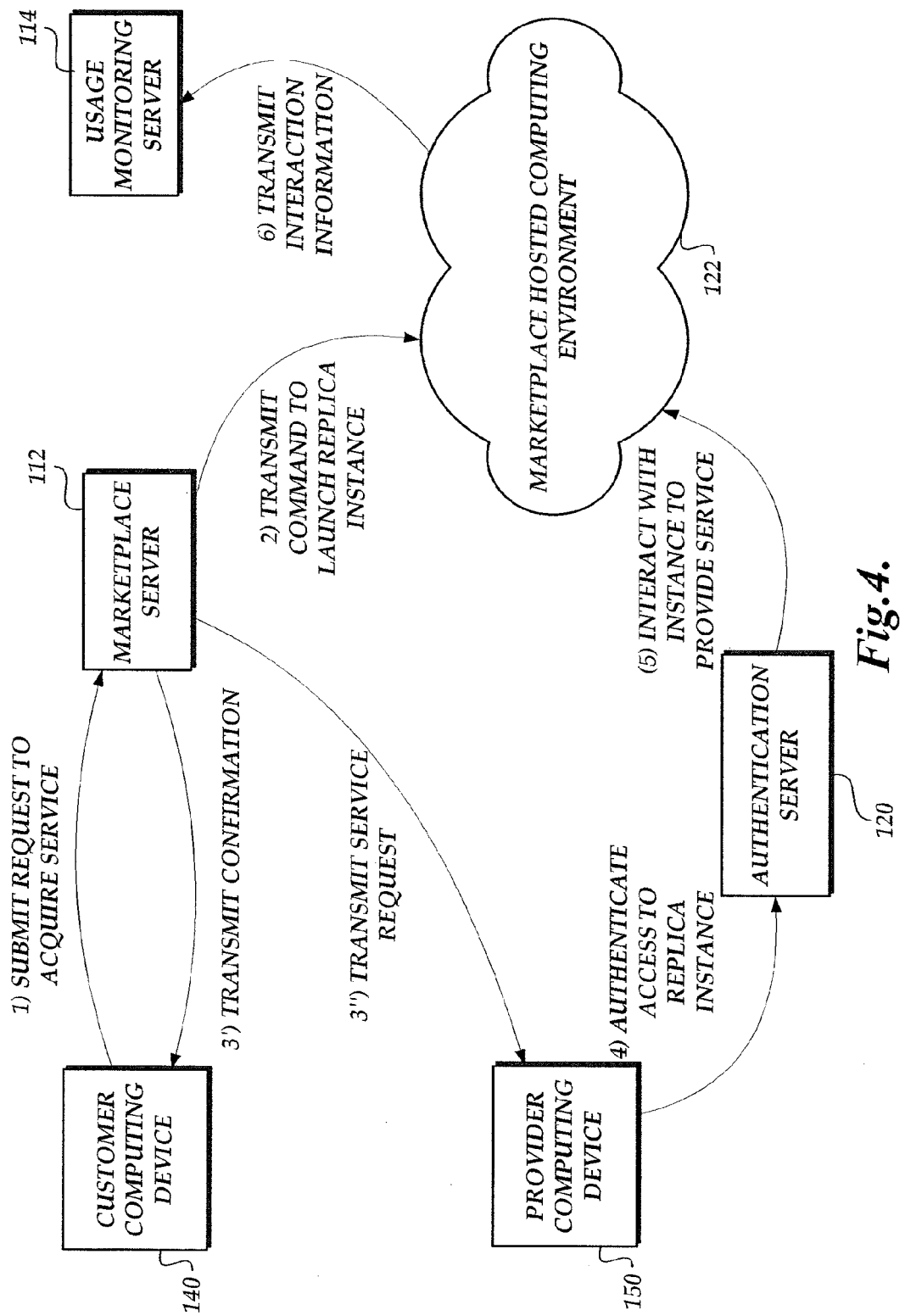
FIG. 4 is a block diagram depicting the acquisition of a service by a customer, an interaction with the marketplace hosted computing environment of FIG. 1 by a provider of the acquired service, and a monitoring of the interaction by the usage monitoring server of FIG. 1.

FIG. 4 is a block diagram depicting the acquisition by a customer of a complimentary service, such as the "Database Optimization" service of FIG. 3, the interaction with a customer instance by a third party associated with that service, and the monitoring of such interaction. In this regard, a customer utilizing a customer computing device 140 may, at (1), request to acquire a service that the customer has found and selected from the electronic hosted services marketplace 100. The request may, for example, be processed by the marketplace server 112 of the electronic hosted services marketplace 100. The requested service may correspond to any service which requires interaction with a customers instance implemented on a hosted computing environment, such as the marketplace hosted computing environment 122 of FIG. 1. For example, the service requested at (1) may correspond to the "Database Optimization" service discussed above with respect to FIG. 3. As discussed with respect to FIG. 3, implementing this database optimization service may require interaction with an instance of a second service implemented on a hosted computing environment. For example, the service requested at (1) may require interaction with an instance of the "Paul's Database" service discussed with respect to FIG. 2.

After receiving the request to acquire a service, the marketplace server 112 may, in some embodiments, transmit a command to the marketplace hosted computing environment 122 to launch a replica of the customer's original instance. For example, the marketplace server 112 may transmit a command to replicate the customer's currently running instance of "Paul's Database." As described above, such a replica instance may be desirably in order to avoid enabling the provider to alter a customer's running instance prior to the customer's review and approval of the provider's interactions. Though described herein with respect to a single replica instance, in some embodiments, the marketplace hosted computing environment may maintain multiple replicas of a given service instance on behalf of a customer. Illustratively, this may allow the customer to review and accept multiple interactions by multiple third parties. These replica instances may be associated with additional or alternative authentication information when compared with the customer's original instance. For example, these replica instances may modify authentication information such that the provider computing device 150 is allowed access to a replica instance, while otherwise being denied access to the original instance. In some embodiments, the replica instance may be accessible only to the provider computing device 150. Such modification of authentication information may enable the provider computing device 150 to access a replica of the customers instance (e.g., in order to provide the advertised service) while maintaining the customer's security with respect to the original instance. In still more embodiments, replica instances may be associated with time periods of use. For example, a replica instance may only be made available for a specified during after creation. Illustratively, this may prevent abuse of the replica instance and may ensure that the service associated with the provider is completed in a timely manner.

In some embodiments, the replicated service may be halted after expiration of the specified time period. In some embodiments, this authentication information may be stored by and enforced by the marketplace hosted computing environment 122. In other embodiments, authentication information may be stored and enforced by the authentication server 120, as will be described below. In still more embodiments, other components (not shown) may store or enforce such authentication information, such as other components of the electronic hosted services marketplace 100 of FIG. 1.

In some embodiments, replica instances for each interaction may not be desirable or feasible to implement. For example, the computing resources associated with multiple instances may be larger than desirable. In these instances, the interaction of (2) may be omitted. In these embodiments, the marketplace server 112 may, in some instances, transmit a command to the marketplace hosted computing environment to record a state of a customer's instance. Such a recording may allow, for example, comparison of data differences between the recorded state and the state of an instance post interaction by a third party. In these embodiments, the marketplace server 112 may transmit commands to the marketplace hosted computing environment 122 which modify authentication procedures of the customer's instance. For example, the marketplace server 112 may transmit commands that enable the provider computing device 150 to access the customer's service instance while maintaining the customer's personal authentication information. As described above, in other embodiments, the authentication server 120 may implement these authentication procedures.

At (3'), the marketplace server 112 may transmit a confirmation of the customer's acquisition to the customer computing device 140. Illustratively, such a confirmation may include information regarding the launching of a replica instance of a customer's service instance or additional information regarding the provider computing device 150, such as the provider's method of access, timeframe for completion of work, contact information, etc.

At (3"), the marketplace server 112 may transmit a service request corresponding to the acquired service to the provider computing device 150. Such a service request may include any information required by the provider to implement the required service. For example, the request may include the authentication information that enables the provider computing device 150 to access the targeted instance on the marketplace hosted computing environment 122 (e.g., a replica instance or the customer's original instance). Though the interaction of (3") is discussed herein subsequently to (3'), these interactions may take place in any order, or may occur simultaneously or substantially simultaneously.

After receiving the transmitted service request, the provider computing device 150 may, at (4) authenticate with the authentication server 120 in order to access the target instance. For the purposes of this illustrative interaction, the target instance may correspond to a replica of the customer's initial instance. As described above, the authentication server 120 may be configured to enforce authentication requirements associated with access to the service instance. For example, the authentication server 120 may require the identity of the provider computing device 150 to be verified (e.g., by entering a username and/or password). Further, the authentication server 120 may enforce timing restrictions on access to the service instance. For example, the provider computing device 150 may only be allowed to access the service instance within a certain time period or time periods (e.g., times of day, a range of dates, etc.), or for specified durations (e.g., no more than a given amount of time). As such, the authentication server 120 may receive any necessary information from the provider computing device 150 and authenticate the provider computing device 150 for access to the customer's service instance.

At (5), the provider computing device 150 may, via the authentication server 120, interact with the replica instance in order to provide the customer's acquired service. As described above, in some embodiments, the authentication server 120 may function as a proxy for access to a customer's instance. In this illustrative example, the provider computing device 150 may transmit commands to the authentication server 120, which may then forward those commands to the customer's instance implemented on the marketplace hosted computing environment 122. The authentication server 120 may thereafter transmit any response from the customer's instance to the provider computing device 150. Though not displayed in FIG. 4, in other embodiments, the provider computing device 150 may be enabled to directly interact with the marketplace hosted computing environment 122 in order to access a customer's instance. In these embodiments, the provider computing device 150 may be required to first authenticate with the authentication server 120 as described above. By interaction with the authentication server 120, the provider computing device 150 may interact with the customer's hosted service instance. For example, in this illustrative interaction, the provider computing device may execute commands or operations on the replica instance in order to optimize the instance on behalf of the customer. One skilled in the art will appreciate that these interactions may correspond to any interactions necessary to provide the acquired service.

At (6), the marketplace hosted computing environment 122 may transmit information corresponding to the provider computing device's utilization of the service to the usage monitoring server 114. In some embodiments, the marketplace hosted computing environment 122 may be configured to transmit information corresponding to utilization in real time or substantially real time. For example, each interaction by the provider computing device may be transmitted to the usage monitoring server 114 as it is received. In other embodiments, the marketplace hosted computing environment 122 may be configured to monitor interactions with the provider computing device 150 and transmit information concerning the interactions at set intervals (e.g., every X seconds), after completion of an interaction, or according to various additional schedules.

Though not shown in FIG. 4, the marketplace hosting computing environment 122 may further be configured to halt the replicated instance subsequent given specified conditions. For example, the replicated instance may be halted subsequent to the customer approving the interactions by the provider computing device. As a further example, the replicated instance may be halted subsequent to elapsing of a time period. Illustratively, a provider may be given 2 weeks during which to complete the acquired service. Should the provider fail to complete the service within this time period, the replicated instance may be halted. In such embodiments, a customer may be entitled to a refund of any purchase price of the acquired service or additional compensation.

Figure 5:
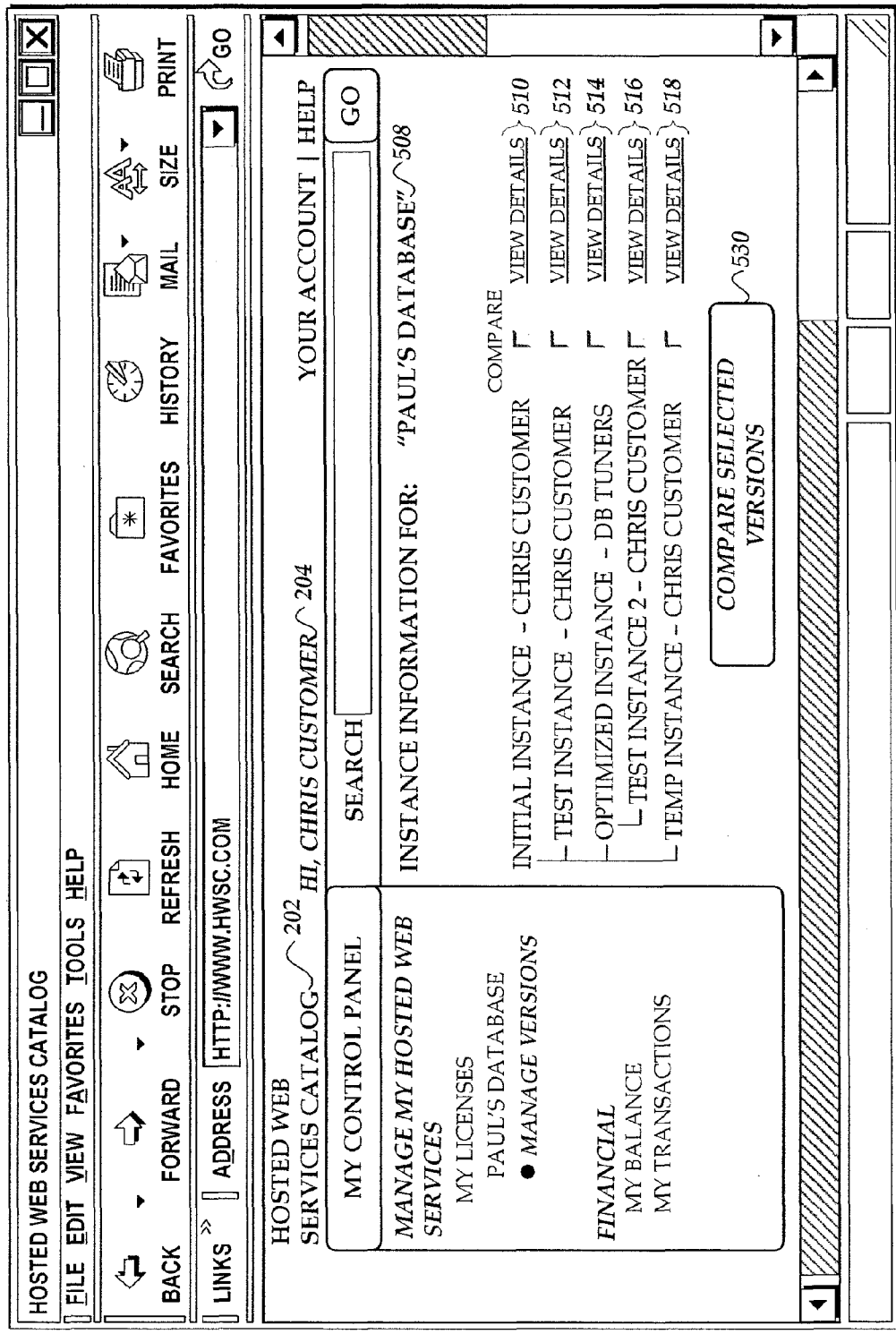
FIG. 5 depicts an illustrative user interface displayed on a customer computing device that enables a customer to view various instances of a hosted service associated with the electronic hosted services marketplace shown in FIG. 1, each instance associated with a monitored interaction with the hosted service.

With reference to FIG. 5, an illustrative user interface 500 is displayed that presents information regarding utilization of a customer's service instance hosted on the electronic hosted services marketplace 100 of FIG. 1. The user interface 500 of FIG. 5 may enable the illustrative customer "Chris Customer" 204 to view histories of various recorded interactions with the customer's instance. In this illustrative example, display feature 508 reflects that details are displayed regarding an instance of the service "Paul's Database" 508 of FIG. 2. Specifically, details regarding a number of versions 510-518 of a service are available for display by the customer. In this illustrative example, each version corresponds to the status of an instance at a given point in time. Further, each version may reflect a title given to the version and a party that created the version. For example, version 510, titled "Initial Instance" was created by "Chris Customer." Similarly, version 514, "Optimized Instance" was created by "DB Tuners." Though not depicted in FIG. 5, each version may show additional or alternative information, such as the date of creation of each version.

As described above, in some embodiments, managing of interactions with services may be facilitated by creating multiple replicas of a given instance. As such, each version 512-520 may derive from a replica of a previous instance. The visual connections between each instance may indicate the source of such a replica. Illustratively, version 512, "Test Instance," is directly connected to version 510, "Initial Instance," and may therefore represent a replica of version 510, the "Initial Instance." Similarly, version 514, "Optimized Instance" may have initially been replicated from version 510, while version 516, "Test Instance 2," may have initially been replicated from the version 514, etc. However, an initially replicated version of a service, such as version 514, may be associated with a set of interactions performed on the replica of a service. For example, version 514, "Optimized Instance" may correspond to a replicated instance on which "DB Tuners" performed the "Database Optimization" service described above with respect to FIG. 3. As such, differences may exist between version 514 and the "Initial Instance" version 510. Accordingly, the interface 500 may enable a customer to view the differences in data between two selected versions. Specifically, the interface 500 may enable a customer to select the checkbox corresponding to two distinct versions, and to select input control 530 in order to compare differences which exist between the two versions. One interface for displaying the differences in data between instance versions of a service will be described in more detail with respect to FIG. 6A, below. As discussed above, in some embodiments, a customer may desire, in addition or alternative to viewing data differences between versions, to view interactions which occurred with respect to a specified version. For example, a customer may wish to view what actions "DB Tuners" took while interacting the version 514, "Optimized Instance." As such, the interface 500 may enable a customer to view interactions with an instance by selecting the "View Details" input control corresponding to each instance version. One interface for displaying the interactions by a third party with regard to a instance version of a service will be described in more detail with respect to FIG. 6B, below.

Though the interface 500 above is illustratively discussed with regard to multiple, replicated instances of a service, in some embodiments, customers may be enabled to manage interactions with a single instance of a service. Illustratively, a customer or third parties may be enabled to record the state of an instance of a service at a given point in time. As such, each of the versions 510-518 of FIG. 5 may represent recordings of the state of an instance. Thereafter, as described above, the customer may select check box input controls corresponding to two versions in order to view differences in data which exist between the two records. In addition, a customer may select the "View Details" input control to view interactions that occurred prior to creation of the record.

Figure 6A:
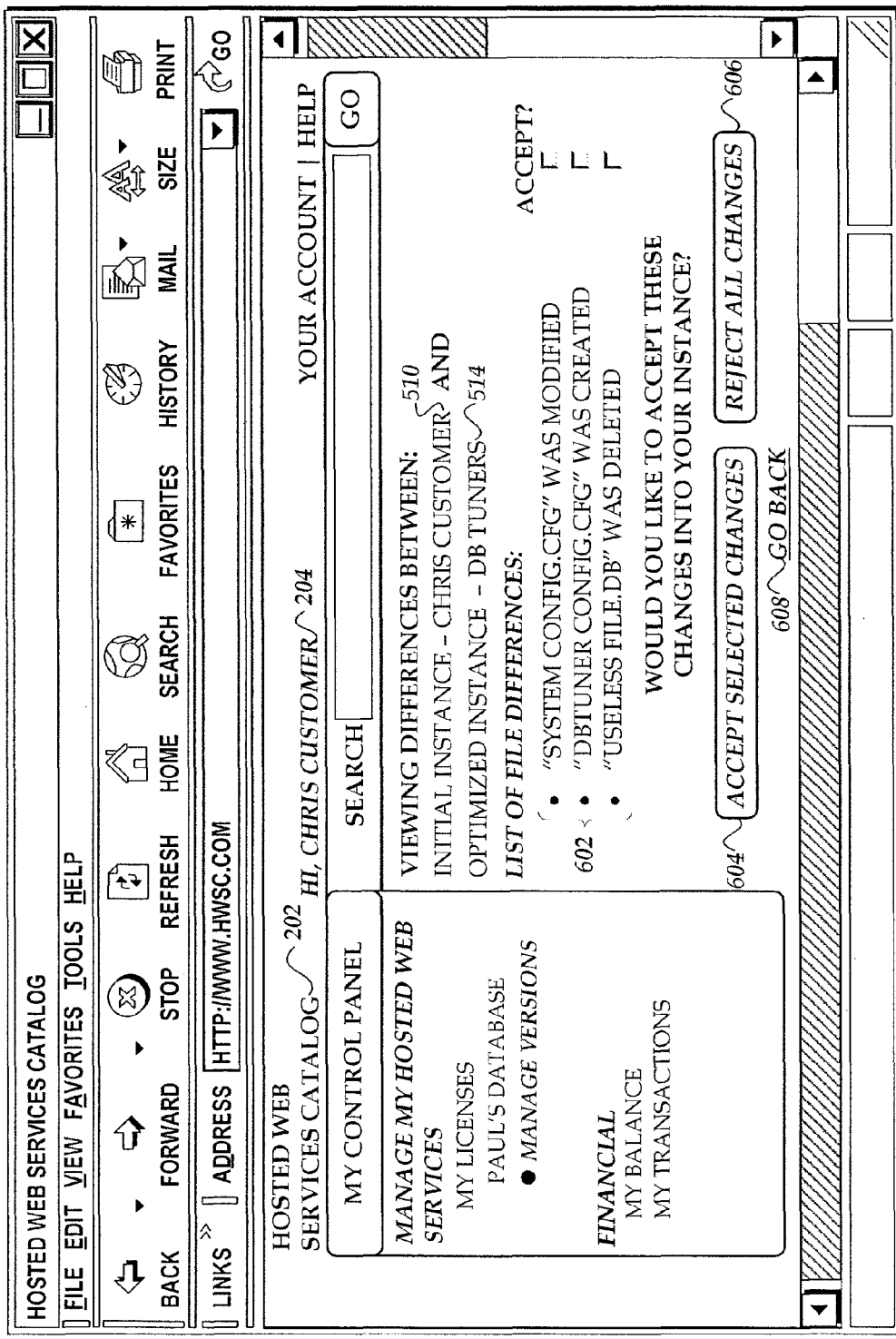
FIG. 6A depicts an illustrative user interface displayed on a customer computing device that enables a customer to view differences in the data associated with two instances of a hosted service available from the electronic hosted services marketplace shown in FIG. 1.

With reference to FIG. 6A, an illustrative user interface 600 is displayed that presents a customer with information regarding differences in data between versions of a service instance.

As described above, in some embodiments, versions of a service instance may correspond to replicated instances of a service. In other embodiments, versions may correspond to recorded states of an instance of a service. In the illustrative depiction of FIG. 6A, data differences between version 510, "Initial Instance," and version 514, "Optimized Instance," are displayed. As described above, version 510 may correspond to an instance of the service "Paul's Database" as initially created by "Chris Customer" 204. Further, version 514 may correspond to the same instance after the "Database Optimization" service has been performed on the instance. As such, Chris Customer may wish to view any differences in data between the two versions 510 and 514. For example, Chris Customer may wish to verify that important data was not removed during the optimization process, or to verify that work was completed in the manner expected. As such, the interface 600 may include a listing of differences in data 602 which exist between the version 510 and the version 514. For example, the listing of differences may reflect files that were created, modified, or deleted during creation of the "Optimized Instance" version 514. In this illustrative example, the file "System Config.cfg" was modified, the file "DBTuner Config.cfg" was modified, and the file "Useless File.db" was deleted.

Illustratively, the listing of differences in data 602 may be created by comparing the file systems of each version. For example, each file on a file system corresponding to version 510 may be compared with each file on a file system corresponding to version 514. As such, any files existing on the earlier version 510, but not on the later version 514 may reflect a deletion of the file. Similarly, files existing on the later version 514, but not existing on the earlier version 510, may reflect creation of the file. Further, files existing on both file systems, but with different contents, may reflect modification to the file. In some embodiments, the interface 600 may enable a customer to view further details regarding a data difference. For example, the interface 600 may enable a customer to view which data within a file was modified, or to view the two versions of data concurrently in order to view differences between the versions.

Further, the customer may be enabled to accept or reject changes to data corresponding to a service instance. For example, in the illustrative user interface 600, the customer may be enabled to select an input control box corresponding to each data difference in order to mark the data difference as accepted or rejected. Thereafter, the customer may select input control 604 in order to accept the selected changes. In this example, acceptance of a change may correspond to altering the "Initial Instance" version 510 to include the data difference. Illustratively, if all changes are acceptance, the "Initial Instance" version 510 may be deleted and replaced with the "Optimized Instance" version 514. By use of such controls, a customer may selectively accept interactions performed by a third party. For example, Chris Customer may accept the modifications performed in conjunction with an acquired "Database Optimization" service. Alternatively, a customer may select input control 606 in order to reject all interactions. Illustratively, this may result in no modification to the "Initial Instance" version 510. Accordingly, a customer may be enabled to reject all interactions with an instance that are unacceptable to the customer. For example, the customer may reject all interactions by a third party associated with a provided service if the results of the service are unacceptable to the customer. As such, the customer may acquire services without risk that the customer's instance will be unavoidably modified prior the customer's review and consent. In addition, the customer may select input control 608 to return to the previously displayed user interface, such as user interface 500 of FIG. 5.

Figure 6B:
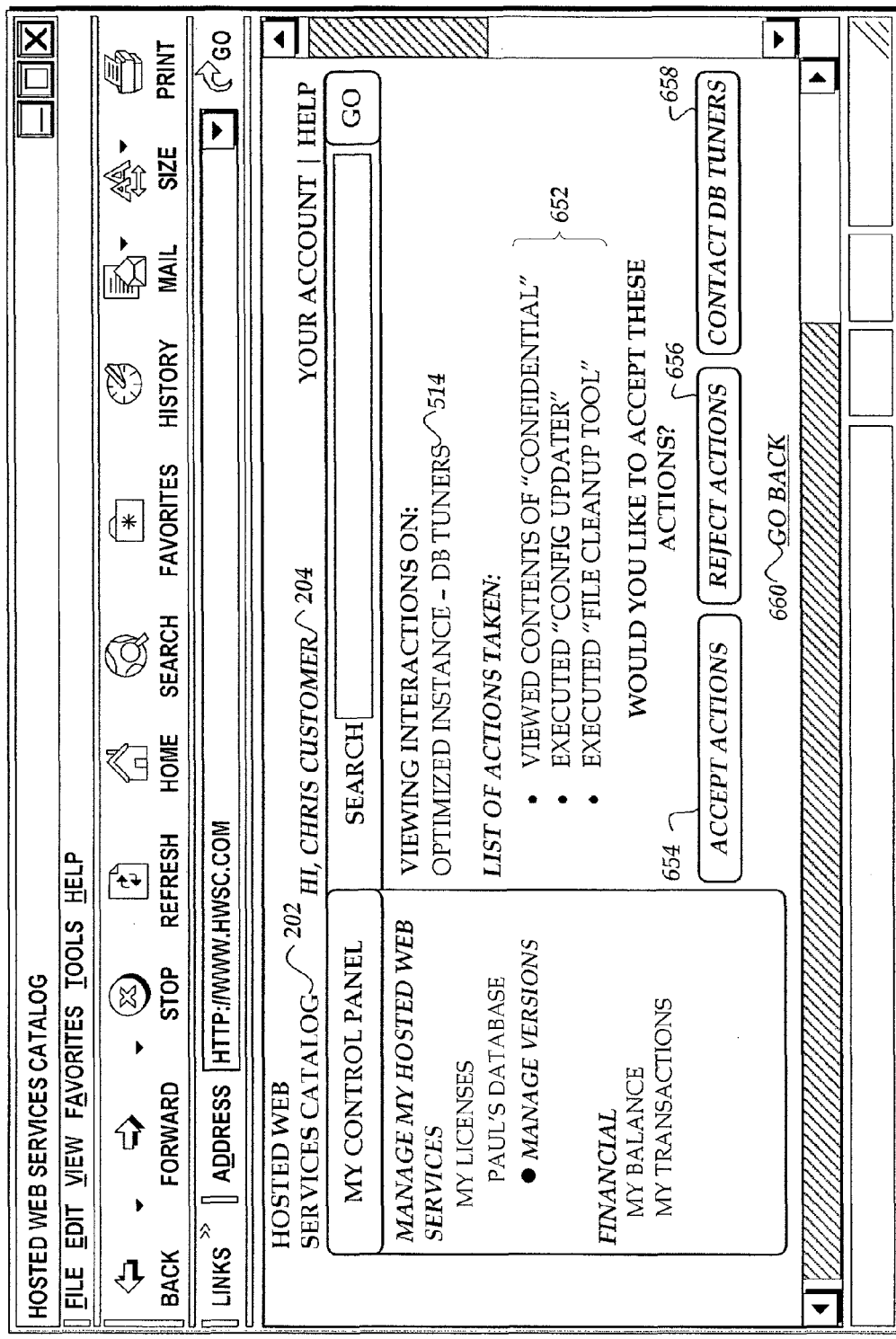
FIG. 6B depicts an illustrative user interface displayed on a customer computing device that enables a customer to review interactions with a hosted service available from the electronic hosted services marketplace shown in FIG. 1.

With reference to FIG. 6B, an illustrative user interface 650 is displayed that presents a customer with information regarding a history of utilization of a service instance. As described above, in some embodiments, versions of a service instance may correspond to replicated instances of a service. As such, the displayed utilizations and interactions may reflect interactions taken with respect to the replicated instance. In other embodiments, versions may correspond to recorded states of an instance of a service. As such, displayed interactions may reflect interactions which occurred prior to creation of the recorded state. In the illustrative depiction of FIG. 6A, a history of interactions taken with respect to version 514, "Optimized Instance," are displayed. As described above, version 514 may correspond to a customer's service instance after the "Database Optimization" service has been performed on the instance. As such, the customer, "Chris Customer" 204, may wish to view a history of the utilization of the customer's instance by the providers of the "Database Optimization" service. For example, Chris Customer may wish to verify that confidential or private data was not accessed during the optimization process, or to verify that work was completed in the manner expected. As such, the interface 650 may include a listing of actions 652 performed on the instance by taken by "DB Tuners" 514. For example, the listing of actions may reflect that files were viewed, created, modified, executed, etc. In this illustrative example, the listing of actions 652 reflects that the file "Confidential" was viewed, the program "Config Updater" was executed, and the program "File Cleanup Tool" was executed.

Illustratively, the listing of actions 652 may include any level of detail with regard to recorded interaction with a service instance. For example, in some embodiments, the listing of actions 652 may reflect each command entered by the interacting party. In other embodiments, the interactions may reflect the all inputs by the interacting party (e.g., mouse movement and key strokes) as well as all outputs (e.g., display, audio, etc.). In still more embodiments, the list of actions 652 may display only a portion of interactions. For example, the customer, the interacting party, or both conjointly may specify types of interaction that should be included (e.g., including certain commands but excluding others). As such, the list of actions 652 may reflect a filtered list of interactions with a service instance. Further, in some embodiments, the list of actions 652 may be abstracted or obscured in accordance with the desires of the customer, the interacting party, or both. For example, the list of actions may specify a program that was executed, but not each modification caused by the executed program. Illustratively, this may maintain the marketability of processes performed by third party service providers (e.g., trade secrets, valuable processes etc.). One skilled in the art will appreciate that the list of interactions may contain any portion of interactions with a service instance as well as any specificity with respect to those interactions.

User interface 650 may further enable a customer to accept or reject interactions to an instance. For example, in the illustrative user interface 600, the customer may be enabled to select input control 654 in order to accept the displayed actions 652. In this example, acceptance of the displayed actions 652 may correspond to altering the "Initial Instance" version 510 to include the data difference. Illustratively, if all changes are acceptance, the "Initial Instance" version 510 may be deleted and replaced with the "Optimized Instance" version 514. By use of such controls, a customer may accept interactions performed by a third party. For example, Chris Customer may accept the actions performed in conjunction with an acquired "Database Optimization" service. Alternatively, a customer may select input control 656 in order to reject all interactions. Illustratively, this may result in no modification to the "Initial Instance" version 510. Accordingly, a customer may be enabled to reject all interactions with an instance that are unacceptable to the customer. For example, the customer may reject all interactions by a third party associated with a provided service if the results of the service are unacceptable to the customer. As such, the customer may acquire services without risk that the customer's instance will be unavoidably modified prior the customer's review and consent. Further, input control 658 may enable a customer to contact the provider of the service which facilitated the listed interactions 652. For example, Chris Customer may desire to contact "DB Tuners," the provider of the "Database Optimization" service in order to inquire regarding certain interactions (e.g., the viewing of the "Confidential" file). In addition, the customer may select input control 660 to return to the previously displayed user interface, such as user interface 500 of FIG. 5.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing interactions with a customer's instance of a service implemented on a hosted computing environment, wherein the customer's instance is executed by a computing device of the hosted computing environment on behalf of the customer, the computer-implemented method comprising:
as implemented by one or more computing devices configured with specific executable instructions,
receiving, from the customer, information specifying an interacting party authorized by the customer to propose a modification to the customer's instance of the service, wherein the customer's instance is distinct from other instances of the network-accessible service implemented on behalf of other customers;
transmitting a command to the hosted computing environment to launch a second instance replicating the customer's instance;
determining a first set of information corresponding to the second instance of the service;
transmitting, to one or more computing devices associated with the interacting party, a notification of the customer's authorization to propose a modification to the customer's instance;
authenticating a request from the one or more computing devices associated with the interacting party to access the second instance;
providing to the one or more computing devices associated with the interacting party access to the second instance;
subsequent to the interacting party accessing the second instance, determining a second set of information corresponding to the second instance, wherein the second set of information is reflective of a state of the second instance subsequent to access of the second instance by the one or more computing devices associated with the interacting party;
detecting a modification to the second instance caused at least in part by the access of the second instance by the one or more computing devices associated with the interacting party, wherein the modification is detected based at least in part on comparing the first set of information and the second set of information;
receiving a request from the customer to view the proposed modification to the customer's instance; and
transmitting to the customer an indication of the modification to the second instance as the proposed modification to the customer's instance.

2. The computer-implemented method of claim 1, wherein transmitting the indication of the modification to the second instance as the proposed modification to the customer's instance comprises transmitting a listing of the indication of the modification to the second instance to the customer.

3. The computer-implemented method of claim 1, wherein the interacting party is at least one of the customer and a third party.

4. The computer-implemented method of claim 1, wherein determining a first set of information corresponding to the second instance and determining a second set of information corresponding to the second instance are performed by a computing device distinct from the computing device of the hosted computing environment that is executing the second instance.

5. The computer-implemented method of claim 3, wherein the interacting party is associated with a service available from an electronic services marketplace associated with the hosted computing environment.

6. A system for managing interactions with a customer's instance of a service implemented on a hosted computing environment, wherein the customer's instance is executed by a computing device of the hosted computing environment on behalf of the customer, the system comprising:
at least one computing device configured to:
receive, from the customer, information specifying an interacting party authorized by the customer to propose a modification to the customer's instance of the service;
transmit a command to the hosted computing environment to launch a second instance replicating the customer's instance;
determine a first set of information corresponding to the second instance;
transmit, to the interacting party, a notification of the customer's authorization to propose a modification to the customer's instance;
authenticate a request from the interacting party to access the second instance;
determine a second set of information corresponding to the second instance subsequent to access to the second instance of by the interacting party, wherein the second set of information is reflective of a state of the second instance subsequent to access of the second instance by the interacting party;
detect a modification to the second instance caused at least in part by the interacting party, wherein the modification is detected based at least in part on a comparison of the first set of information and the second set of information;
receive a request from the customer to view the proposed modification to the customer's instance; and
transmit to the customer an indication of the modification to the second instance as the proposed modification to the customer's instance.

7. The system of claim 6, wherein at least one of the first set of information or the second set of information comprises at least one file associated with the second instance.

8. The system of claim 6, wherein the modification comprises at least one of a modification of data, a creation of data, or a deletion of data.

9. The system of claim 6, wherein the at least one computing device is further configured to:
receive, from the customer, an acceptance of the proposed modification to the customer's instance; and
modify customer's instance of the service implemented by the hosted computing environment on behalf of the customer in accordance with the second set of information.

10. The system of claim 6, wherein the at least one computing device is further configured to:
receive, from the customer, a rejection of the proposed modification to the customer's instance; and
halt the second instance.

11. The system of claim 6, wherein the at least one computing device is distinct from the computing device of the hosted computing environment executing the second instance.

12. A computer-readable, non-transitory storage medium having computer-executable instructions for managing interactions with a customer's instance of a service implemented on a hosted computing environment, wherein the customer's instance is executed by a computing device of the hosted computing environment on behalf of the customer, wherein the computer-executable instructions, when executed by a processor, cause the processor to:
receive, from the customer, information specifying an interacting party authorized by the customer to propose a modification to the customer's instance of the service;
transmit a command to the hosted computing environment to launch a second instance replicating the customer's instance;
determine a first set of information corresponding to the second instance;
transmit, to the interacting party, a notification of the customer's authorization to propose a modification to the customer's instance;
authenticating a request from the interacting party to access the second instance;
determine a second set of information corresponding to the second instance subsequent to access to the second instance of by the interacting party, wherein the second set of information is reflective of a state of the second instance subsequent to access of the second instance by the interacting party;
detect a modification to the second instance caused at least in part by the interacting party, wherein the modification is detected based at least in part on a comparison of the first set of information and the second set of information;
receive a request to view the proposed modification to the customer's instance; and
transmit to a device associated with the requestor an indication of the modification to the second instance as the proposed modification to the customer's instance.

13. The computer-readable, non-transitory storage medium of claim 12, wherein the second instance is associated with authentication information enabling the interacting party to access the customer's instance.

14. The computer-readable, non-transitory storage medium of claim 13, wherein the authentication information is enforced by an authentication computing device.

15. The computer-readable, non-transitory storage medium of claim 14, wherein authentication of the interacting party is based at least in part on timing of access by the interacting party or an identity of the interacting party.

16. A computer-implemented method for managing interactions with a customer's instance of a service implemented on a hosted computing environment, wherein the customer's instance is executed by a computing device of the hosted computing environment on behalf of the customer, the computer-implemented method comprising:
as implemented by one or more computing devices configured with specific executable instructions,
receiving, from the customer, information specifying an interacting party authorized by the customer to propose a modification to the customer's instance;
transmitting a command to the hosted computing environment to launch a second instance replicating the customer's instance;
determining a first set of information corresponding to the second instance;
transmitting, to the interacting party, a notification of the customer's authorization to propose a modification to the customer's instance;
authenticate a request from the interacting party to access the second instance;
subsequent to the interacting party accessing the second instance, determining a second set of information corresponding to the second instance;
determining a modification to the second instance caused at least in part by the interacting party, wherein the modification is determined based at least in part on comparing the first set of information and the second set of information;

receiving a request to view the proposed modification to the customer's instance; and transmitting to a device associated with the requestor an indication of the modification to the second instance as the proposed modification to the customer's instance.

17. The computer-implemented method of claim 16, wherein at least one of the first or second set of information comprises at least one file associated with the customer's instance.

18. The computer-implemented method of claim 16, wherein the modification comprises at least one of a modification of data, a creation of data, or a deletion of data.

19. The computer-implemented method of claim 16 further comprising:

receiving an acceptance of the proposed modification; and implementing the proposed modification to the within the hosted computing environment at least in part by modifying the customer's instance in accordance with the modification to the second instance.

20. The computer-implemented method of claim 1 further comprising:

receiving an acceptance of the proposed modification; and implementing the proposed modification within the hosted computing environment at least in part by modifying the customer's instance in accordance with the modification to the second instance.

21. The computer-readable, non-transitory storage medium of claim 16, wherein the computer-executable instructions, when executed by the processor, further cause the processor to:

receive, from the customer, an acceptance of the proposed modification to the customer's instance; and modify the customer's instance of the service implemented by the hosted computing environment on behalf of the customer in accordance with the modification to the second instance.

\* \* \* \* \*